P. H. STARKE.
Plow.
No. 29,726. Patented Aug. 21, 1860.
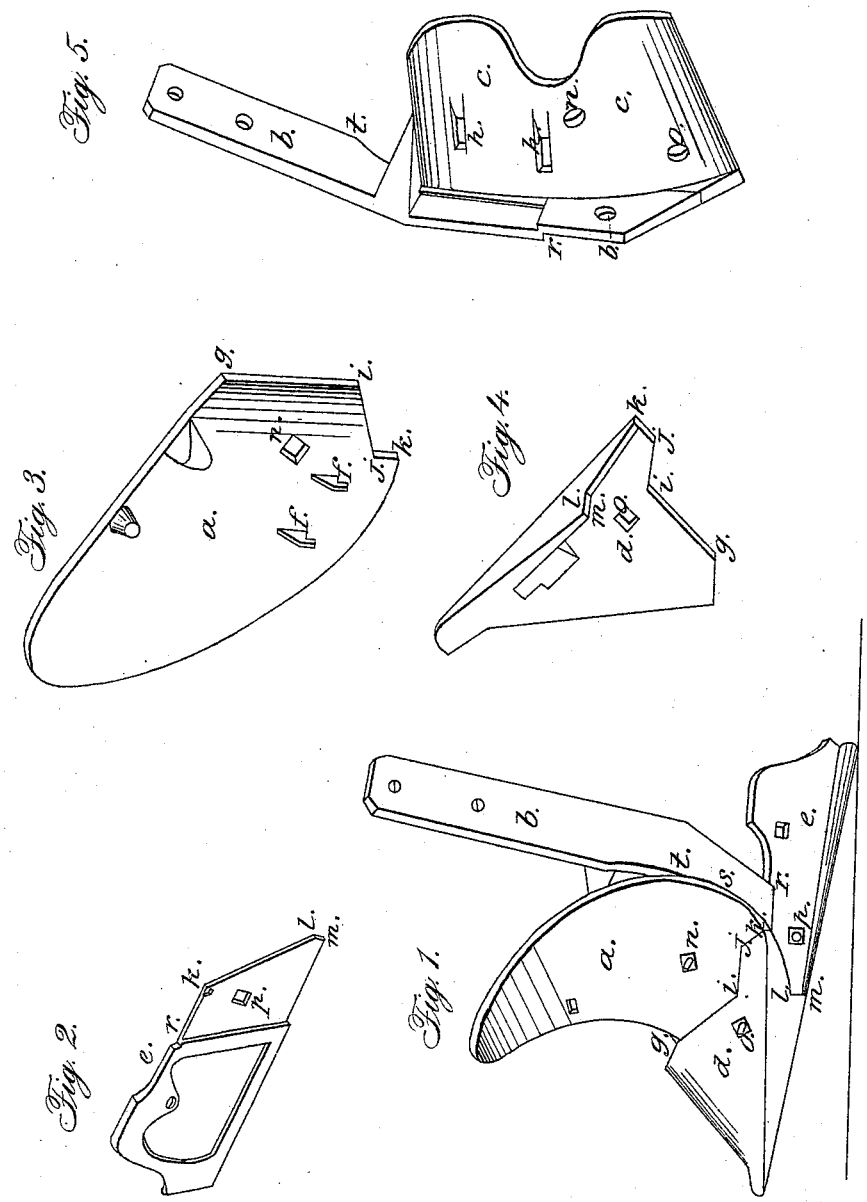
Witnesses:
P Nerning
Geo J Hennig
Inventor:
P H Starke

UNITED STATES PATENT OFFICE.

P. H. STARKE, OF RICHMOND, VIRGINIA.

IMPROVEMENT IN PLOWS.

Specification forming part of Letters Patent No. 29,726, dated August 21, 1860.

*To all whom it may concern:*

Be it known that I, P. H. STARKE, of the city of Richmond, in the State of Virginia, have invented a new and useful Improvement in Plows; and I do hereby declare that the following is a full and exact description of the same, reference being had to the accompanying drawings, and to the letters of reference marked thereon, so as to enable others skilled in the art to make use of my invention.

Figure 1 represents the frame $b$ $c$, mold-board $a$, point $d$, and side $e$, when fastened together so as to form a complete plow, with the exception of the wood-work or stock of the plow; Fig. 2, a view of the inner side of the side board, $e$; Fig. 3, a view of the bottom side of the mold-board $a$; Fig. 4, a bottom view of the point $d$, and Fig. 5 an inside view of the frame $b$ $c$.

The frame of my plow consists of an upright standard, $b$, provided with a curved flange or wing, $c$ $c$, (see Fig. 5,) and with a recess, $r$ $k$ $l$ $m$, in the lower part of its side.

The mold-board $a$ is made with a zigzag edge, $g$ $i$ $j$ $k$, Fig. 3, and its bottom is provided with two projections or hooks, $f$ $f$. The curvature of the wing or flange $c$ $c$ of the frame is such as to fit the curvature of the mold-board. The point $d$ is made with an edge, $g$ $i$ $j$ $k$, Fig. 4, on its upper side, and with an edge, $k$ $l$ $m$, Fig. 4, on its side. The side board, $e$, Fig. 2, is made with an edge, $r$ $k$ $l$ $m$. There is no projection on the frame $b$ $c$, against which the mold-board and point rest. The mold-board is flush with the side of the standard $b$ on the line $k$ $s$ $t$, as seen in Fig. 1, and thus, as there is no projection on the standard against which the edge $k$ $s$ $t$ of the mold-board rests, the mold-board might be extended beyond the line $k$ $s$ $t$, so as to answer the purposes of various kinds of plows. The shape of the mold-board is only limited on the line $g$ $i$ $j$ $k$; but in every other direction it may be shaped at pleasure, making one plow answer the several purposes of subsoil, cultivating, sod, and stubble and fallow plow of any size and shape.

The mold-board is fastened to the wing $c$ $c$ of the frame by passing the hooks $f$ $f$, projecting from the bottom surface of the mold-board, through the slots $h$ $h$ in the wing, so that the overlapping ends of the hooks will come to rest against the bottom surface of the wing, and a bolt is then inserted through the holes $n$ in the mold-board and wing. The side board, $e$, is attached to the frame by placing the part of its edge $k$ $r$ against the edge $k$ $r$ of the recess $r$ $k$ $l$ $m$ in the side of the standard and passing a bolt through the holes $p$ in the side board and standard. The point $d$ is then brought up so that its edge $g$ $i$ $j$ $k$ joins the edge $g$ $i$ $j$ $k$ of the mold-board, and its edge $k$ $l$ $m$ rests against the edge $k$ $l$ $m$ of the side board, all as shown in Fig. 1. A bolt passing through the holes $o$ in the wing $c$ and point $d$ fastens the latter to the wing.

The four parts of the plow, being thus fastened together and joining on the line $g$ $i$ $j$ $k$ $m$ $l$ $r$, serve to brace each other and form a plow which, for all practical purposes, is as substantial as if made of one piece, while the mold-board, point, and side board may be varied in shape in any direction, except on the line $g$ $i$ $j$ $k$ $m$ $l$ $r$, where they are joined, for the purpose of adapting the plow to the various purposes of a subsoil, cultivating, sod plow, &c.

It will also be seen that all the wearing parts of the frame of my plow are covered by the mold-board, point, and side board, so that the frame will not be worn at all, and that one frame may answer any length of time.

Having described my invention, what I claim therein as new, and desire to secure by Letters Patent, is—

The construction and relative arrangement of the wing $c$ $c$ and mold-board $a$ $g$ $i$ $j$ $k$, fastened together by means of bolt $n$ and hooks $f$ $f$ and slots $h$ $h$, the plow-standard $b$ $t$ $s$ $r$, the point $d$ $g$ $i$ $j$ $k$ $l$ $m$, and the landside $e$ $r$ $l$ $m$, all as shown and described.

P. H. STARKE.

Witnesses:
GEO. I. HENING,
M. H. GARDNER.